Feb. 21, 1961            I. V. DOMINIC            2,972,494
CLIP FOR CONNECTING INTERSECTING AND
ABUTTING WIRES, RODS AND THE LIKE
Filed May 13, 1960
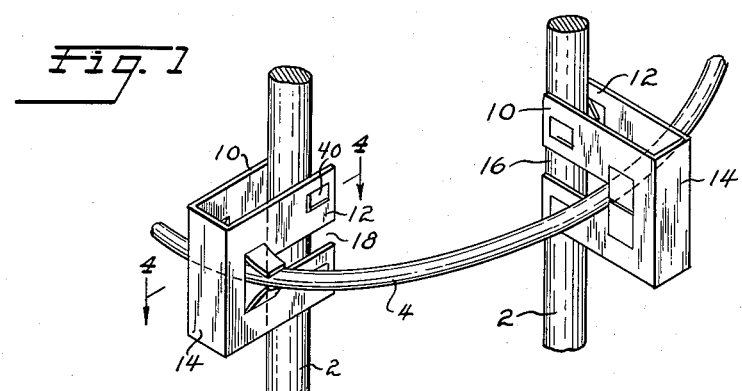
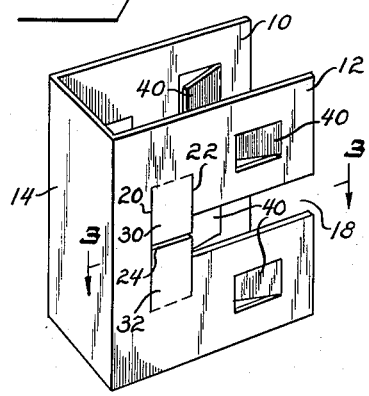 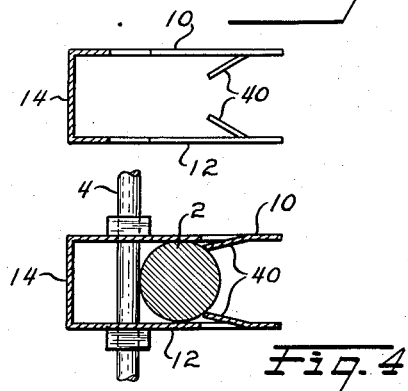
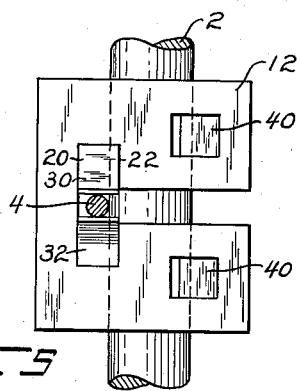 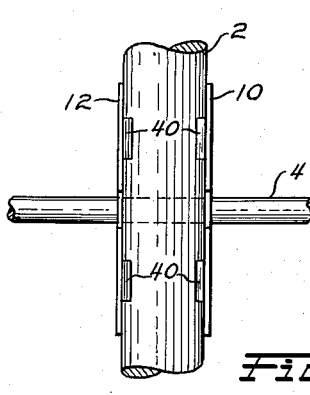
INVENTOR
IVAN V. DOMINIC
BY *Scrivener & Parker*
ATTORNEYS

United States Patent Office 2,972,494
Patented Feb. 21, 1961

2,972,494

CLIP FOR CONNECTING INTERSECTING AND ABUTTING WIRES, RODS AND THE LIKE

Ivan V. Dominic, Hamilton, Ontario, Canada, assignor to Associated Spring Corporation, Bristol, Conn., a corporation of Delaware Filed May 13, 1960, Ser. No. 29,030

3 Claims. (Cl. 287—54)

This invention relates to devices for connecting together two intersecting, substantially abutting, rods, wires or the like such, for example, as the longitudinal and helical reinforcing rods of cast concrete poles.

It is the principal object of the invention to provide such a device in the form of a sheet metal clip which is U-shaped in cross-section to receive one of the rods or wires and the side walls of which are provided with slots to receive the other, the clip being provided in its side walls with resilient fingers which engage and hold the two rods or wires firmly but releasably, whereby the clip can be easily and quickly applied thereto and removed therefrom.

The invention is described in the following specification and is illustrated in the accompanying drawing, in which:

Fig. 1 is a perspective view showing intersecting rods connected by devices according to this invention, one of such devices being only partially in connecting position;

Fig. 2 is a perspective view of the connecting clip provided by the invention;

Fig. 3 is a sectional view taken on line 3—3 of Fig. 2;

Fig. 4 is a view which is similar to Fig. 3 but shows two rods in position within and connected by the clip, and Figs. 5 and 6 are, respectively, side and front elevational views of the clip.

The device provided by this invention is constructed and intended to quickly and releasably connect together two rods, or two wires, or a rod and a wire, which are in substantially abutting relation and which intersect each other at some angle including a right angle. Although the invention is not in any way restricted to the connection of any specific parts, it will be described in this application as connecting the longitudinal rods and the helical high tensile wire which, together, provide the reinforcing means for a concrete pole which is cast or formed in any known way.

The reinforcing means of such a pole are shown in part in Fig. 1, in which the numeral 2 designates two of the longitudinal metal reinforcing rods which are embedded within the cast pole at equal intervals about its circumference in accordance with known construction, and the numeral 4 designates a helical wire associated with the longitudinal rods 2 and which extends substantially from end to end of the pole in abutting relation to the rods 2 whereby it also is embedded in the cast pole.

Means are provided by this invention for connecting together such reinforcing rods and wire at each point of intersection thereof. Such means comprise a clip formed of thin sheet metal having considerable resilience. This spring metal clip is U-shaped in cross section having side walls 10, 12 and a bottom 14. The side walls are preferably spaced apart sufficiently so that they will comfortably receive between them one of the two members to be connected by the clip, in this case the rod 2. Each of the side walls 10, 12 is provided with a slot which extends from the free edge of the wall substantially, but not entirely, to the bottom 14. These slots 16, 18 are preferably of equal width, and are parallel to each other and aligned and are preferably disposed equi-distantly between the side edges of the side walls 10, 12 of the clip, although they may be positioned nearer to one edge than the other and, in special cases, they may not be aligned with each other transversely of the clip. These slots are of sufficient width to receive the rod or wire which is not received between the side walls, and in the disclosed embodiment of the invention these slots are sufficiently wide to receive the helical wire 4.

At the inner end of each slot, and adjacent and parallel to the bottom 14 of the clip each side wall of the clip is formed with two spaced, parallel slits 20, 22 which are longer than the width of the adjacent slot 16 or 18 and at substantially right angles thereto. A third slit 24 is formed at right angles to these two slits in the center line of the adjacent slot 16 or 18 and the slits 20, 22, 24 therefore define, in each side wall of the clip, two spring fingers 30, 32 which extend in opposite directions to each other at right angles to the adjacent slot, with their inner, free ends lying preferably and substantially in the median line of the slot. The two spring fingers of each pair normally lie in the plane of the side wall from which they are formed and are adapted to be deformed outwardly of the plane of the side wall when a rod or wire is moved into the slots 16, 18 and forced between the free ends of the spring fingers.

Means are also provided by the invention for engaging and resiliently holding another rod or wire, such as the reinforcing rod 2 shown in Fig. 1. Such means comprise spring fingers 40, two of which are struck from each of the side walls 10, 12 of the U-shaped clip and are disposed on opposite sides of the slot 16 or 18 therein. These spring fingers 40 are defined by slits in the sheet metal of the clip and each of them is integrally connected to the wall of the clip adjacent the free end edge of the side walls, and each of these spring fingers is normally biased inwardly of the side walls and of the clip so that when a rod or wire is forced between the side walls the spring fingers will be moved from their normal inwardly biased positions toward the side walls in order to let the rod or wire pass into the clip beyond their free ends, after which the fingers will move back to their normal positions inwardly of the side walls, thereby preventing any undesired movement of the rod or wire out of the clip.

In the use of a clip as provided by the invention to connect two intersecting, substantially abutting rods or wires, such as those shown at 2 and 4 in the drawings, and which have been first positioned in intersecting and substantially abutting relation, the clip is first positioned on the helical wire 4 by positioning the wire within the aligned, parallel slots 16, 18 and pushing on the bottom of the clip to move the wire 4 to the bottom of the slots. This will cause the wire to spread the spring fingers 30, 32 outwardly of the side walls of the clip to the positions shown at the left in Fig. 1 of the drawings. These spring fingers will thereafter bear firmly on the rod 4 and hold the clip thereon. It will be seen that four of these spring fingers bear on the rod 4, thus providing a firm and strong connection. The rod 2 is now connected to the rod 4 by means of the clip by moving rod 2 between the side walls of the clip, past the inwardly biased spring fingers 40 until the rod 2 abuts wire 4 as shown at the left side of Fig. 1 of the drawings. As rod 2 passes into the clip it will press the fingers 40 toward the side walls and as the rod passes beyond the free ends of these spring fingers the fingers will move back to their normal positions inwardly of the side walls, as shown in Fig. 2 of the drawings, thus firmly holding the rod 2 within the clip and connecting the rod 2 and wire 4.

While I have described certain embodiments of my invention it will be apparent to those skilled in the arts to which this invention relates the other embodiments, as well as modifications of those disclosed, may be made and practiced without departing in any way from the spirit or scope of the invention, for the limits of which reference must be made to the appended claims.

What is claimed is:

1. A device for connecting two intersecting substantially abutting rods, wires or the like comprising a sheet metal clip which is U-shaped in cross section having substantially parallel side walls and a bottom, each side wall having a slot therein extending from its free edge toward the bottom but stopping short of the bottom, each side wall at the inner end of the slot therein having two parallel slits which extend at right angles to the slot and which define two spring fingers which are separated at their inner ends and open outwardly of the clip when a rod, wire or the like is forced into the two slots and between said spring fingers, each of said side walls having an inwardly extending spring finger adjacent the outer edge thereof and being defined by slits in the side wall, the free end edge of each of said latter spring fingers facing the bottom of the clip whereby a rod, wire or the like forced between said side walls will be held within the clip by said spring fingers.

2. A device for connecting two intersecting substantially abutting rods, wires or the like comprising a sheet metal clip which is U-shaped in cross section having substantially parallel side walls and a bottom, each side wall having a slot therein extending from its free edge toward the bottom but stopping short of the bottom, each side wall at the inner end of the slot therein having two parallel slits which extend at right angles to the slot and which define two spring fingers which are separated at their inner ends, each of said spring fingers normally lying flat in the plane of the side wall and being adapted and intended to be moved outwardly about its connection to the side wall to bear resiliently upon a rod, wire or the like which is pushed into the slots in the side walls and between the spring fingers, each of said side walls having an inwardly extending spring finger adjacent the outer edge thereof and being defined by slits in the side wall, the free end edge of each of said latter spring fingers facing the bottom of the clip whereby a rod, wire or the like forced between said side walls will be held within the clip by said spring fingers.

3. A device for connecting two intersecting substantially abutting rods, wires or the like comprising a sheet metal clip which is U-shaped in cross section having substantially parallel side walls and a bottom, each side wall having a slot therein extending from its free edge toward the bottom but stopping short of the bottom, each side wall at the inner end of the slot therein having two parallel slits which extend at right angles to the slot and which define two spring fingers which are separated at their inner ends and open outwardly of the clip when a rod, wire or the like is forced into the two slots and between said spring fingers, each of said side walls having an inwardly extending spring finger adjacent the outer edge thereof and being defined by slits in the side wall, the free end edge of each of said latter spring fingers facing the bottom of the clip and being normally positioned inwardly of the side walls whereby a rod, wire or the like forced between said side walls will be held within the clip by said spring fingers.

References Cited in the file of this patent
UNITED STATES PATENTS

| | | |
|---|---|---|
| 606,461 | Johnson | June 28, 1898 |
| 812,053 | Lense | Feb. 6, 1906 |
| 891,059 | Greer | June 16, 1908 |